(12) United States Patent
Muñoz López et al.

(10) Patent No.: US 8,870,117 B2
(45) Date of Patent: Oct. 28, 2014

(54) COMPOSITE AIRCRAFT FRAME

(75) Inventors: María Pilar Muñoz López, Cuenca (ES); Elena Arévalo Rodríguez, Madrid (ES); Javier Cabeza Huertas, Segovia (ES); Enrique Vera Villares, Madrid (ES); Melania Sánchez Pérez, Madrid (ES)

(73) Assignee: Airbus Operations S.L., Getafe, Madrid (ES)

( * ) Notice: Subject to any disclaimer, the term of this patent is extended or adjusted under 35 U.S.C. 154(b) by 285 days.

(21) Appl. No.: 13/339,087

(22) Filed: Dec. 28, 2011

(65) Prior Publication Data

US 2012/0305707 A1 Dec. 6, 2012

(30) Foreign Application Priority Data

May 31, 2011 (ES) .................... 201130896

(51) Int. Cl.
 *B64C 1/00* (2006.01)
 *B64C 1/06* (2006.01)
(52) U.S. Cl.
 CPC ................ *B64C 1/061* (2013.01); *Y02T 50/43* (2013.01); *B64C 2001/0072* (2013.01); *Y02T 50/433* (2013.01)
 USPC ............................ 244/119; 244/120; 244/131

(58) Field of Classification Search
 CPC .......... B64C 1/061; B64C 1/068; B64C 1/069
 USPC .............................. 244/119, 120, 117 R, 131
 See application file for complete search history.

(56) References Cited

U.S. PATENT DOCUMENTS

| | | | |
|---|---|---|---|
| 7,861,970 B2 * | 1/2011 | Griess et al. ................... | 244/120 |
| 2009/0277994 A1 | 11/2009 | Lobato et al. | |
| 2012/0141703 A1 * | 6/2012 | Goetze .......................... | 428/34.1 |
| 2012/0213955 A1 * | 8/2012 | Biesek et al. ................. | 428/34.1 |
| 2014/0001311 A1 * | 1/2014 | Dopker et al. ................. | 244/120 |

FOREIGN PATENT DOCUMENTS

| | | |
|---|---|---|
| EP | 1 030 807 A1 | 8/2000 |
| GB | 2 268 461 A | 1/1994 |
| WO | WO 2009/129007 A2 | 10/2009 |

\* cited by examiner

*Primary Examiner* — John Woodrow Eldred
(74) *Attorney, Agent, or Firm* — Birch, Stewart, Kolasch & Birch, LLP

(57) ABSTRACT

Composite aircraft frame (1) comprising two segments (10, 20), each of these segments (10, 20) being single unitary element made in composite material and comprising at least one web (2), a stiffening structure and a fitting (4), the two segments (10, 20) being joint by the fittings (4) using rivets, forming the aircraft frame (1). The invention also refers to a method for fabricating such an aircraft frame (1).

15 Claims, 1 Drawing Sheet

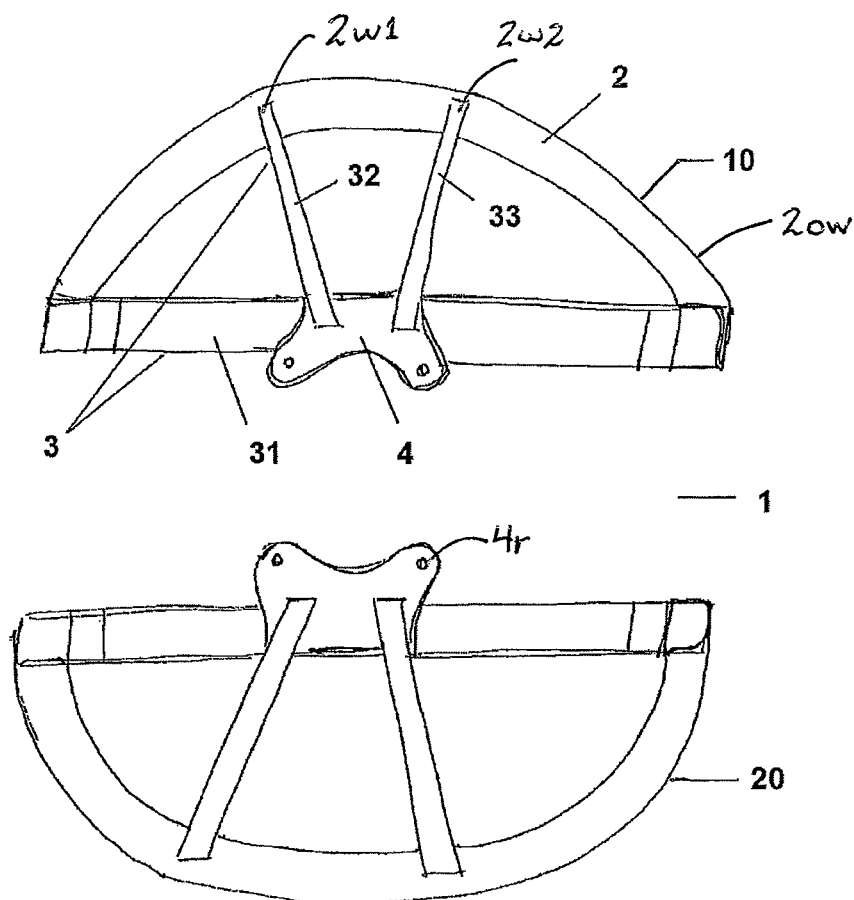
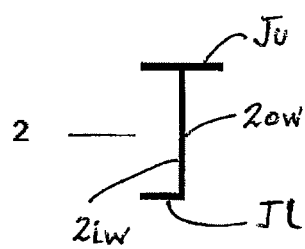
FIG. 1
FIG. 2

COMPOSITE AIRCRAFT FRAME

FIELD OF THE INVENTION

The present invention refers to an aircraft frame made in composite material and to a method of fabrication of such a frame.

BACKGROUND OF THE INVENTION

The airframe in an aircraft comprises the main structural body designing the shape and the structural behaviour of said aircraft. At present, composite materials are widely used in aircraft design, thus also being used for forming the frames of aircraft.

Looking at an aircraft fuselage, a typical structure includes skin and frames, each of them with its different function and performance. An interface frame for instance is located between two sections. It is typically very demanded with regard to stresses and structural behaviour, thus having to withstand very high loads. For this reason, the interface frame has typically been made in a metallic material, in order to obtain good mechanical resistance and appropriate tolerances. The fabrication of these interface frames of metallic material is both costly and time consuming, also requiring a high number of pieces effecting the joints of the different metallic segments, fabricated separately. Besides, corrosion plays a fundamental role when metallic materials are used.

Moreover, a metallic material is an isotropic material, so the design of metallic interface frames is made in such a way that the same kind of material having the same resistance is used all over the interface frame. Therefore, more material is needed than in a case in which an anisotropic material is used, such as a composite material: in such a case, the material is distributed so as to provide higher resistance only where it is needed.

Lastly, now that composites materials are more and more used, specially in skins, hybrid structures containing composites and metallic materials show many integration problems: thermal expansions differences, galvanic corrosion, disparity in tolerance concepts, analysis procedures, etc.

To make best use of composite materials, an all-composite structure shall be aimed.

Document US 2009277994 discloses a hybrid airframe, comprising structural components made in a metallic material and non-structural components made in composite material. The airframe also comprises metallic frames, reinforced by means of longitudinal composite stringers, metallic joint members and metallic ties. The main disadvantage of such structure is that the weight is higher than in a case in which only composite material is used. Moreover, the manufacturing process and joints of these elements is costly and time consuming.

Document EP 1030807 describes a composites structural solution for a rear pressure frame for an aircraft. Pressures frames are very special structural parts, as they are the interface between pressurized and unpressurized fuselage sections and thus they must withstand very specific pressure loads. However, this solution cannot be applied to other structural frames, where all this composite closed surface is not needed and means too much of unnecessary weight.

Document WO 2009/129007 discloses a method for manufacturing composite material frames for aircraft having multiple legs (webs). This manufacturing method covers on more way to achieve the traditional structural concept of a frame, but it does not present any innovative structural concept.

Document GB 2268461 discloses a hybrid frame for an aircraft, comprising composite external and internal covers, together with reinforcing elements made in a metallic material. This document gives a manufacturing solution to a central fuselage and flying surfaces attached in an integrated way. The joints of these two components are mainly the object of the GB 2268461 invention.

It would thus be desirable to provide a structural solution for a frame of the fuselage of an aircraft, fully made in composite material and without the need of riveting different pieces to provide the whole structure of the frame, thus being provided a more effective fabrication method of said interface frame.

The present invention is oriented towards this need.

SUMMARY OF THE INVENTION

An object of the present invention is to provide an aircraft frame, preferably an interface aircraft frame, made in composite material, such that this frame comprises two segments, each made as a single unitary piece in composite material, these two segments being further joint to form the complete frame structure.

Each one of the segments of the frame according to the invention comprises the following elements: at least one web, a stiffening structure and a fitting.

The frame of the invention provides the following advantages:
 the structure obtained is lighter;
 fatigue problems in the structure are minimized;
 corrosion problems are eliminated;
 manufacturing tolerances are higher;
 spring back effect is minimized;
 manufacturing costs and timings are highly reduced.

The invention also refers to a method of fabricating an aircraft frame made in composite material. In the Resin Transfer Moulding manufacturing process (RTM), dry fibers are placed in a closed, pressurized mould, then the liquid resin is injected. With this known process, complex parts made of composites are feasible.

Other characteristics and advantages of the present invention will be clear from the following detailed description of embodiments illustrative of its object in relation to the attached figures.

DESCRIPTION OF THE DRAWINGS

FIG. 1 shows a schematic view of the elements forming an interface aircraft frame made in composite material according to the present invention.

FIG. 2 shows a preferred cross-section view of the web forming the elements of an interface aircraft frame made in composite material according to the present invention.

DETAILED DESCRIPTION OF THE INVENTION

The invention thus refers to an aircraft frame, preferably an aircraft frame 1, preferably an interface frame, made in composite material, such that this frame 1 comprises two segments, 10 and 20, each segment, 10, 20, being made as a single unitary piece in composite material. As can be seen in FIGS. 1 and 2, each of the two segments 10, 20 includes an arc-shaped web 2 with a convex-shaped outer side wall 2ow and a concave-shaped inner side wall 2iw, so that each of the two segments 10, 20 has an open interior. Further, the stiffening structure has multiple components 31, 32, 33, each of which extends in a direction that is perpendicular to the convex-shaped outer side wall 2ow.

Each of the segments 10, 20 of the frame 1 according to the invention comprises the following elements: at least one web 2, a stiffening structure and a fitting 4. The preferred cross-section of the web 2 of the segments 10, 20 of the frame 1 has a shape similar to a letter "J", as represented in FIG. 2. When a cross-section the segments 10, 20 of the web 2 is viewed from a direction perpendicular to the cross-section (i.e., directly facing the cross-section), the cross-section of each of the segments 10, 20 can be seen to have a shape similar to a letter "J", with a top portion Jt of the "J" that is longer than a lower portion Jl, and the top portion Jt of the "J" is parallel to the lower portion Jl. The stiffening structure preferably comprises several stiffening bars 3, typically two diagonal bars 32, 33 and a horizontal bar 31 (see embodiment of FIG. 1). According to the invention, a typical segment 10 of a frame 1, comprising a web 2, two diagonal bars 32, 33, a horizontal bar 31, and a fitting 4, is obtained from a single unitary piece from one single cocured part having five performs, 2, 31, 32, 33 and 4. Once the segments 10 and 20 are obtained, each one being unitary, they are joined by riveting the fitting on each of the segments 10, 20 to each other by rivets 4r. In this way, the manufacturing process of the frame 1 is highly simplified, and riveting is highly reduced, as the only riveting needed is now that of the fittings 4, joining the segments 10, 20 to form the frame 1.

The method for fabricating this frame comprises the steps of:
a) lay-up and cut of fiber plies
b) pre-forming of the laminate
c) preforms placement into the mould
d) vacuum application
e) resin injection with pressure
f) resin curing by heat application
g) de-moulding The different plies are defined by the design of the aircraft frame 1. These plies can be cut to the given pattern manually, by means of electrical devices or by other usual automated processes such as water-jet, oscillator knives, US blades . . .

After laying up the plies, a pre-forming (for example under vacuum and heat) is carried out on a tooling (for pre-forming or injection). Stacked plies are placed on a tool and a vacuum bagging is made for compacting plies before and during the heating. This operation allows to consolidate the geometry of the pre-form before its insertion in the injection mould.

The different pre-forms that compose the aircraft frame 1 can be hold together by means of different known processes, such as stitching, to be handled and moved to the next tools.

If the injection tool is ready (prepared with release agent, cleaned, etc.), the preforms are placed there and the tool is assembled and closed. The injection equipment is connected, the resin can be prepared (if necessary degassed), heated at injection temperature and injected with the given parameters, depending on the materials used.

Also the specific cure cycle parameters of each composite element depend on the material or materials used in the part, and on the type and configuration of the element that is to be manufactured.

After curing, the part shall not be disassembled from the curing tool until it is cooled down.

Then, the tool can be disassembled (if applicable), and the part demoulded.

Although the preferred process is to fabricate each element of segment 10 or 20 cocured together (in only one curing cycle as an integrated frame), each element forming the segment 10 or 20 can also be cured separately (this method is preferable in case of big dimensions of the parts obtained). This should be decided depending on final dimensions, capabilities, logistics and other factors that influence manufacturing.

Although the present invention has been fully described in connection with preferred embodiments, it is evident that modifications may be introduced within the scope thereof, not considering this as limited by these embodiments, but by the contents of the following claims.

The invention claimed is:

1. An aircraft frame (1) comprising:
two segments (10, 20),
each of the two segments (10, 20) being a single unitary element made of composite material, and
each of the two segments (10, 20) including:
at least one arc-shaped web (2) with a convex-shaped outer side wall (2ow), and a concave-shaped inner side wall (2iw) so that each of the two segments (10, 20) has an open interior,
a stiffening structure with multiple components (31, 32, 33), each of which extends in a direction that is perpendicular to the convex-shaped outer side wall (2ow), and
a fitting (4) arranged in a position located where a portion of the multiple component (31, 32, 33) join each other,
wherein the two segments (10, 20) are joined together by the fitting (4) of each of the two segments (10, 20) using rivets (4r), thereby forming the aircraft frame (1) in a manner such that the concave-shaped inner side walls (2iw) of each of the two segments (10, 20) directly face each other.

2. The aircraft frame (1) according to claim 1, wherein the multiple components of the stiffening structure of each of the two segments (10, 20) include:
at least one horizontal bar (31) extending across where the two segments (10, 20) are joined together,
at least a first diagonal bar (32) extending from a first position near a central portion along a length of the one bar (31) to a first point (2w1) on the concave-shaped inner side walls (2iw), and
at least a second diagonal bar (33) extending from a second position near the central portion along the length of the one bar (31) to a second point (2w2) on the concave-shaped inner side walls (2iw),
wherein the first and second diagonal bars (32, 33) extend at an acute angle with respect to each other.

3. The aircraft frame (1) according to claim 1, wherein the web (2) of the segments (10, 20) of the aircraft frame (1) can be seen to have a has a cross-section with a shape similar to a letter "J" when the cross-section of each of the segments (10, 20) of the web (2) is viewed from a direction perpendicular to the cross-section.

4. A method for fabricating an aircraft frame (1) according to claim 1, comprising the following steps:
laying-up and cutting of fiber plies, and
pre-forming of a laminate to form preforms;
placing the preforms placement into the-a mould;
injecting resin with pressure;
curing each of the preforms by a heat application, and
de-moulding the preforms.

5. The method for fabricating an aircraft frame (1) according to claim 4, wherein the step of cutting the fiber plies is performed by means of electrical devices, or by other automated processes, such as with a water-jet, with oscillator knives, or with US blades.

6. The method for fabricating an aircraft frame (1) according to claim 4, wherein elements forming the segments (10, 20) are co-cured together in only one curing cycle, forming the aircraft frame (1).

7. The method for fabricating an aircraft frame (1) according to claim 4, wherein elements forming the segments (10, 20) are cured separately.

8. The aircraft frame according to claim 2, wherein the web (2) of the segments (10,20) of the aircraft frame (1) can be seen to have cross-section with a shape similar to a letter "J" when the cross-section of each of the segments (10, 20) of the web (2) is viewed from a direction perpendicular to the cross-section.

9. The method for fabricating an aircraft frame according to claim 2,
- laying-up and cutting of fiber plies, and
- pre-forming of a laminate to form preforms;
- placing the preforms into a mould;
- injecting resin with pressure;
- curing each of the preforms by a heat application, and
- de-moulding the preforms.

10. The method for fabricating an aircraft frame according to claim 3,
- laying-up and cutting of fiber plies, and
- pre-forming of a laminate to form preforms;
- placing the preforms into a mould;
- injecting resin with pressure;
- curing each of the preforms by a heat application, and
- de-moulding the preforms.

11. The method for fabricating an aircraft frame according to claim 5, wherein elements forming the segments (10, 20) are co-cured together in only one curing cycle, forming the aircraft frame (1).

12. The method for fabricating an aircraft frame according to claim 5, wherein elements forming the segments (10, 20) are cured separately.

13. The aircraft frame (1) according to claim 3, wherein the cross-section of each of the segments (10, 20) of the web (2) having the shape similar to the letter "J" has top portion (Jt) that is longer than a lower portion (J1).

14. The aircraft frame (1) according to claim 3, wherein the cross-section of each of the segments (10, 20) of the web (2) having the shape similar to the letter "J" has top portion (Jt) that is parallel to a lower portion (J1).

15. An aircraft frame (1) comprising:
two segments (10, 20),
each of the two segments (10, 20) being a single unitary element made of composite material, and
each of the two segments (10, 20) including:
at least one arc-shaped web (2) with a convex-shaped outer side wall (2ow), and a concave-shaped inner side wall (2iw) so that each of the two segments (10, 20) has an open interior,
a stiffening structure with multiple components (31, 32, 33), each of which extends in a direction that is perpendicular to the convex-shaped outer side wall (2ow), and
a fitting (4) arranged away from the concave-shaped inner side wall (2iw) at a central portion of the arc-shaped web (2),
wherein the two segments (10, 20) are joined together by the fitting (4) of each of the two segments (10, 20), thereby forming the aircraft frame (1).

* * * * *